United States Patent
Tamai et al.

(10) Patent No.: US 8,146,690 B2
(45) Date of Patent: Apr. 3, 2012

(54) METHOD OF CONTROLLING AN AUXILIARY PUMP FOR A TRANSMISSION

(75) Inventors: Goro Tamai, West Bloomfield, MI (US); Jy-Jen F. Sah, West Bloomfield, MI (US); Eric S. Tryon, Indianapolis, IN (US); Scott A Miller, Commerce Township, MI (US); Steven J. Shepherd, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 369 days.

(21) Appl. No.: 12/474,703

(22) Filed: May 29, 2009

(65) Prior Publication Data

US 2010/0303636 A1    Dec. 2, 2010

(51) Int. Cl.
*B60W 10/30* (2006.01)

(52) U.S. Cl. .................................. 180/65.275; 180/338
(58) Field of Classification Search .............. 180/65.21, 180/65.275, 65.6, 65.7, 305, 306, 338, 339; 477/97, 98; 417/32
See application file for complete search history.

(56) References Cited

U.S. PATENT DOCUMENTS

| 7,396,308 B2 * | 7/2008 | Tabata et al. .................. 475/159 |
| 2009/0192685 A1 * | 7/2009 | Sime .............................. 701/60 |

* cited by examiner

*Primary Examiner* — John Walters
(74) *Attorney, Agent, or Firm* — Quinn Law Group, PLLC

(57) ABSTRACT

A method of operating an auxiliary pump for an electrically variable transmission includes purging the auxiliary pump when an auxiliary pump temperature is below a minimum operating temperature and above a minimum purge temperature. The auxiliary pump fluid temperature and the minimum purge temperature are determined based upon the transmission fluid temperature and the ambient temperature.

13 Claims, 3 Drawing Sheets

METHOD OF CONTROLLING AN AUXILIARY PUMP FOR A TRANSMISSION

TECHNICAL FIELD

The present invention relates, generally, to an auxiliary pump for an electrically variable transmission, and more specifically, to system for controlling the operation of the auxiliary pump for the electrically variable transmission.

BACKGROUND OF THE INVENTION

Vehicles with electrically variable transmissions commonly operate in Electric Vehicle (EV) mode. In EV mode, the vehicle engine is shut down and the vehicle is driven by the transmission including the associated battery and motor/generators. Typically, a main transmission pump is used to operate the transmission during standard vehicle operation, i.e. when the engine is operating. However, the main transmission pump is typically powered by the vehicle engine. Thus, when the vehicle is in EV mode the main transmission pump is not powered and an auxiliary transmission pump is used to operate the transmission clutches, etc.

In cold climates the auxiliary pump fluid temperature can be low for a long period after the vehicle has been operating. The low fluid temperatures result from the location of the auxiliary pump and associated connections located outside of the transmission. Starting the auxiliary pump when the auxiliary pump fluid temperature is low may cause a pressure drop within the transmission fluid lines as the fluid from the auxiliary pump enters the transmission. The pressure drop effects the performance of the transmission clutches. Thus, the auxiliary pump may not be started until the pump fluid has reached a desirable operating temperature. Depending on the external temperature, this may take a significant amount of time. Since operating in EV mode is contingent on the use of the auxiliary pump, the vehicle is prevented from entering EV mode until the auxiliary pump fluid has reached the ideal minimum operating temperature.

SUMMARY OF THE INVENTION

A method for operating an auxiliary pump for an electrically variable transmission for a vehicle is provided. Operation of the auxiliary pump begins by inputting a signal to start a determination of availability of an auxiliary pump. An ambient temperature and a transmission fluid temperature are obtained. The ambient temperature is compared with the transmission fluid temperature to determine an auxiliary fluid temperature and a minimum operating temperature. The auxiliary fluid temperature is then compared with a minimum purge temperature. The auxiliary pump is purged when the auxiliary pump temperature is below the minimum operating temperature and above the minimum purge temperature. A shift to electric vehicle mode of the transmission is instructed when the auxiliary pump temperature is greater than or equal to the minimum operating temperature The shift to electric vehicle mode is also instructed if the purging of the auxiliary pump was successful.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
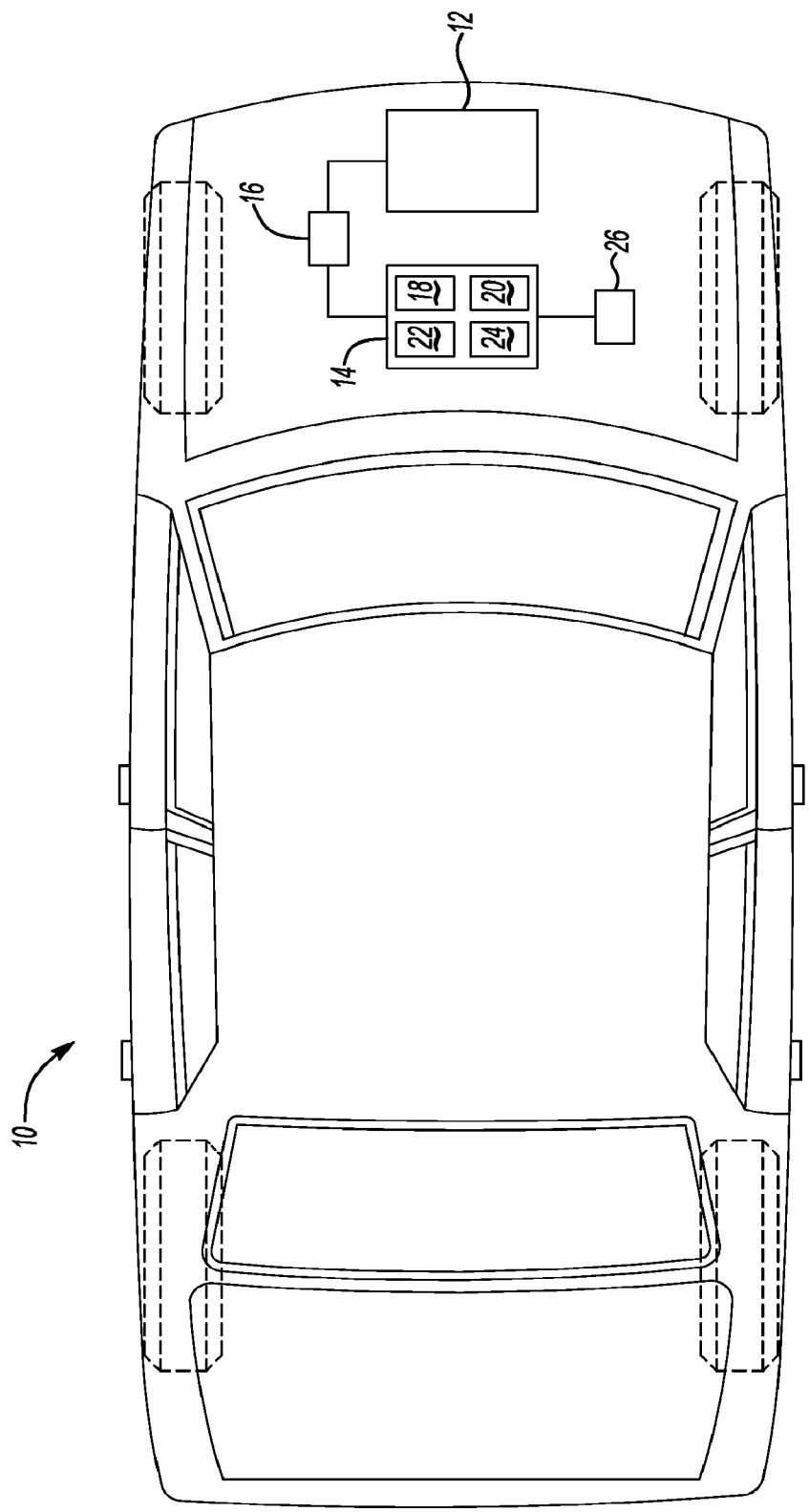
FIG. 1 is a schematic illustration of a vehicle having an electrically variable transmission and an auxiliary pump.

Referring to the Figures, wherein like reference numbers refer to the same or similar components throughout the several views, FIG. 1 schematically illustrates a vehicle 10 including an engine 12 and an electrically variable transmission 14. In the embodiment shown, the transmission 14 operates in a standard operating mode, when the engine 12 is running, and in an electric vehicle (EV) mode, when the engine 12 is turned off. An electronic control unit (ECU) 16 is connected to the engine 12 and the transmission 14 for controlling operation of the engine 12 and the transmission 14. The ECU 16 controls the timing and operation of the vehicle 10 and controls shifting the transmission 14 between the standard operating mode and EV mode. For example, the vehicle 10 power output indicates power may be optimized by shifting to EV mode.

The transmission 14 includes at least one motor/generator 18, a main transmission pump 20, a plurality of gears 22 and at least one clutch 24. Additionally, an auxiliary pump 26 is located externally of and fluidly connected to the transmission 14.

When the vehicle 10 is in standard operating mode the engine 12 is running and provides power to the main transmission pump 20 to operate the at least one transmission clutch 24 as well as other components of the vehicle 10. When the vehicle 10 is operating in EV mode the engine is off and the main transmission pump 20 is not powered. Thus, the auxiliary pump 26 operates the transmission clutches. The ECU 16 determines when the vehicle 10 is prepared to shift from standard operating mode to EV mode and the ECU 16 generates a signal that a shift to EV mode is available. Determining when the vehicle 10 is prepared to shift from standard operating mode to EV mode includes determining if the auxiliary pump 26 is available for operation.

For the auxiliary pump 26 to be available for operation, the auxiliary pump fluid temperature ($T_{AUX}$) must be at a minimum operating temperature ($T_{OP}$). The minimum operating temperature ($T_{OP}$) is the minimum auxiliary pump 26 fluid temperature ($T_{AUX}$) at which the auxiliary pump 26 can begin operation, without affecting the performance of the transmission 14 and the transmission clutch 24. The minimum operating temperature ($T_{OP}$) is dependent on the allowable pressure difference that is created by the different transmission 14 fluid temperature ($T_{TF}$) and auxiliary pump 26 fluid temperature ($T_{AUX}$). Therefore, the minimum operating temperature ($T_{OP}$) will vary depending on the transmission 14 fluid temperature ($T_{TF}$).

Typically, there is not a temperature sensor located in the auxiliary pump 26. The auxiliary pump 26 fluid temperature ($T_{AUX}$) will increase over time, while the vehicle 10 is running, as the auxiliary pump 26 absorbs heat from other components that are proximate to the auxiliary pump 26. However, since the auxiliary pump 26 is not operating until the vehicle 10 is in EV mode the fluid in the auxiliary pump 26 does not warm as quickly as the fluid in the transmission 14, which is operating. As a result, determining the auxiliary pump fluid temperature ($T_{AUX}$) is based upon the ambient temperature ($T_{AMB}$) of the environment, and a transmission 14 fluid temperature ($T_{TF}$). The transmission 14 fluid temperature ($T_{TF}$) is the current temperature of the fluid within transmission 14, specifically the fluid within a sump portion of the transmission 14.

If the auxiliary pump 26 fluid temperature ($T_{AUX}$) is below the minimum operating temperature ($T_{OP}$) then the auxiliary pump 26 can be purged with warmer fluid from the sump portion of the transmission 14. The auxiliary pump 26 can only be purged with the transmission 14 fluid when the transmission 14 fluid temperature ($T_{TF}$) is at a sufficient temperature to raise the auxiliary pump 26 fluid temperature ($T_{AUX}$) to the minimum operating temperature ($T_{OP}$). In addition, the higher the ambient temperature ($T_{AMB}$) the less the auxiliary pump 26 fluid temperature ($T_{AUX}$) will need to be raised to reach the minimum operating temperature ($T_{OP}$). Therefore, the minimum purge temperature ($T_{PURGE}$) is also a function of the ambient temperature ($T_{AMB}$) and the transmission 14 fluid temperature ($T_{TF}$).

Figure 2:
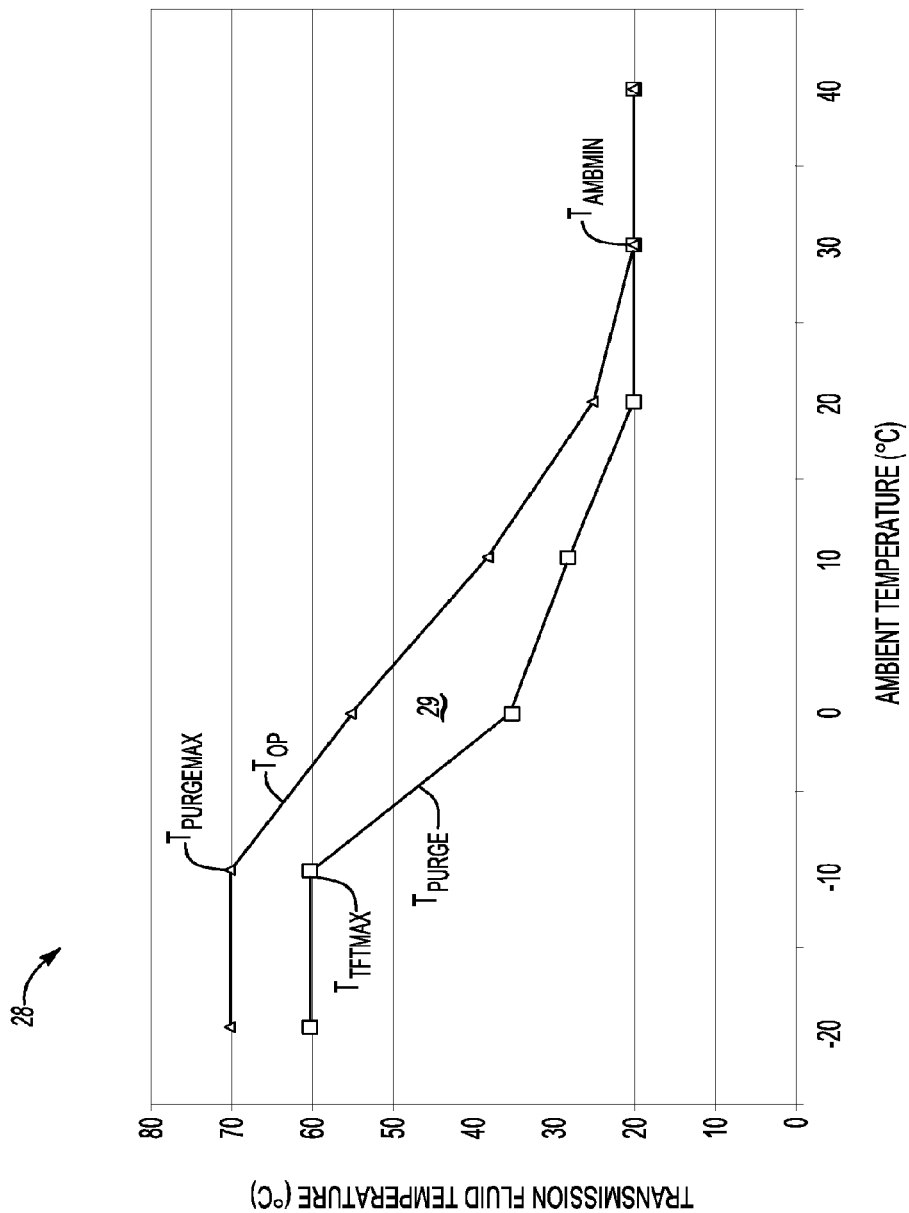
FIG. 2 is a schematic illustration showing a graph comparing an ambient temperature and the transmission fluid temperature of the transmission of FIG. 1.

Referring to FIG. 2, one embodiment for determining the auxiliary pump 26 fluid temperature ($T_{AUX}$), the minimum operating temperature ($T_{OP}$) and the minimum purge temperature ($T_{PURGE}$) is graphically represented. The graph 28 compares the ambient temperature ($T_{AMB}$) and the transmission 14 fluid temperature ($T_{TF}$).

The minimum operating temperature ($T_{OP}$) is represented on the graph 28 relative to the ambient temperature ($T_{AMB}$) and the transmission fluid temperature ($T_{TF}$) As mentioned above, the minimum operating temperature ($T_{OP}$) is dependent on the transmission 14 fluid temperature ($T_{TF}$). When the auxiliary pump 26 fluid temperature ($T_{AUX}$) is above the minimum operating temperature ($T_{OP}$) the auxiliary pump 26 does not need to be purged before shifting to EV mode. When the ambient temperature ($T_{AMB}$) is above a minimal ambient temperature ($T_{AMBMIN}$) the auxiliary pump 26 fluid temperature ($T_{AUX}$) will be determined to be at least at the minimum operating temperature ($T_{OP}$) regardless of the transmission 14 fluid temperature ($T_{TF}$). In the embodiment shown, the minimal ambient temperature ($T_{AMBMIN}$) is 30 degrees Celsius.

The transmission 14 fluid temperature ($T_{TF}$) will increase over time while the vehicle 10 is running. The auxiliary pump 26 fluid temperature ($T_{AUX}$) will also increase over time as the auxiliary pump 26 absorbs heat from other components. Therefore, the higher the transmission 14 fluid temperature ($T_{TF}$), the higher the auxiliary pump 26 fluid temperature ($T_{AUX}$) is calculated to be. In the embodiment shown, once the transmission 14 fluid temperature ($T_{TF}$) has reached a predetermined maximum purge temperature ($T_{PURGEMAX}$) then the auxiliary pump 26 fluid temperature ($T_{AUX}$) is determined to be at the minimum operating temperature ($T_{OP}$) regardless of the ambient temperature ($T_{AMB}$). In the embodiment shown, the predetermined maximum purge temperature ($T_{PURGEMAX}$) is 70 degrees Celsius.

When the auxiliary pump 26 fluid temperature ($T_{AUX}$) is below the minimum purge temperature ($T_{PURGE}$) there is not sufficient heat in the transmission 14 fluid to raise the auxiliary pump 26 fluid temperature ($T_{AUX}$) to the minimum operating temperature ($T_{OP}$). The auxiliary pump 26 is not purged, the EV mode shift is aborted and the vehicle 10 cannot shift to EV mode until the minimum purge temperature ($T_{PURGE}$) is reached.

As mentioned above, when the ambient temperature ($T_{AMB}$) is above a minimum ambient temperature ($T_{AMBMIN}$) the auxiliary pump 26 fluid temperature ($T_{AUX}$) will be determined to be at the minimum operating temperature ($T_{OP}$) regardless of the transmission 14 fluid temperature ($T_{TF}$). Therefore, at the minimal ambient temperature ($T_{AMBMIN}$) and above, no minimum purge temperature ($T_{PURGE}$) is required.

When the transmission 14 fluid temperature ($T_{TF}$) reaches a predetermined maximum temperature ($T_{TFTMAX}$), the transmission 14 fluid is determined to have enough heat to sufficiently raise the auxiliary pump 26 fluid temperature ($T_{AUX}$), regardless of ambient temperature ($T_{AMB}$). In the embodiment shown, once the transmission 14 fluid temperature ($T_{TF}$) has reached the predetermined maximum temperature ($T_{TFTMAX}$), then the auxiliary pump 26 fluid temperature ($T_{AUX}$) is determined to be at the minimum operating temperature ($T_{OP}$) regardless of the ambient temperature ($T_{AMB}$). The auxiliary pump 26 can be purged. Once the transmission 14 fluid temperature ($T_{TF}$) reaches the predetermined maximum purge temperature ($T_{PURGEMAX}$) purging the auxiliary pump will no longer be required.

Between the minimum ambient temperature ($T_{MINAMB}$) and the predetermined maximum fluid temperature ($T_{TFTMAX}$), the ambient temperature ($T_{AMB}$), and the transmission 14 fluid temperature ($T_{TF}$) have an inverse relationship for determining the minimum purge temperature ($T_{PURGE}$). When the auxiliary pump 26 fluid temperature ($T_{AUX}$) is above the minimum purge temperature ($T_{PURGE}$) and below the minimum operating temperature ($T_{OP}$), the auxiliary pump 26 is in the purge zone 29. When in the purge zone 29 the auxiliary pump 26 can be purged and then the vehicle 10 can shift to EV mode.

The graph 28 represents one embodiment for determining the auxiliary pump 26 fluid temperature ($T_{AUX}$) and the minimum purge temperature ($T_{PURGE}$). Other temperatures may be used to determine the minimum purge temperature ($T_{PURGE}$) and the minimum operating temperature ($T_{OP}$). One skilled in the art would know the proper minimum purge temperature ($T_{PURGE}$) and the minimum operating temperature ($T_{OP}$) for a particular vehicle 10.

Figure 3:
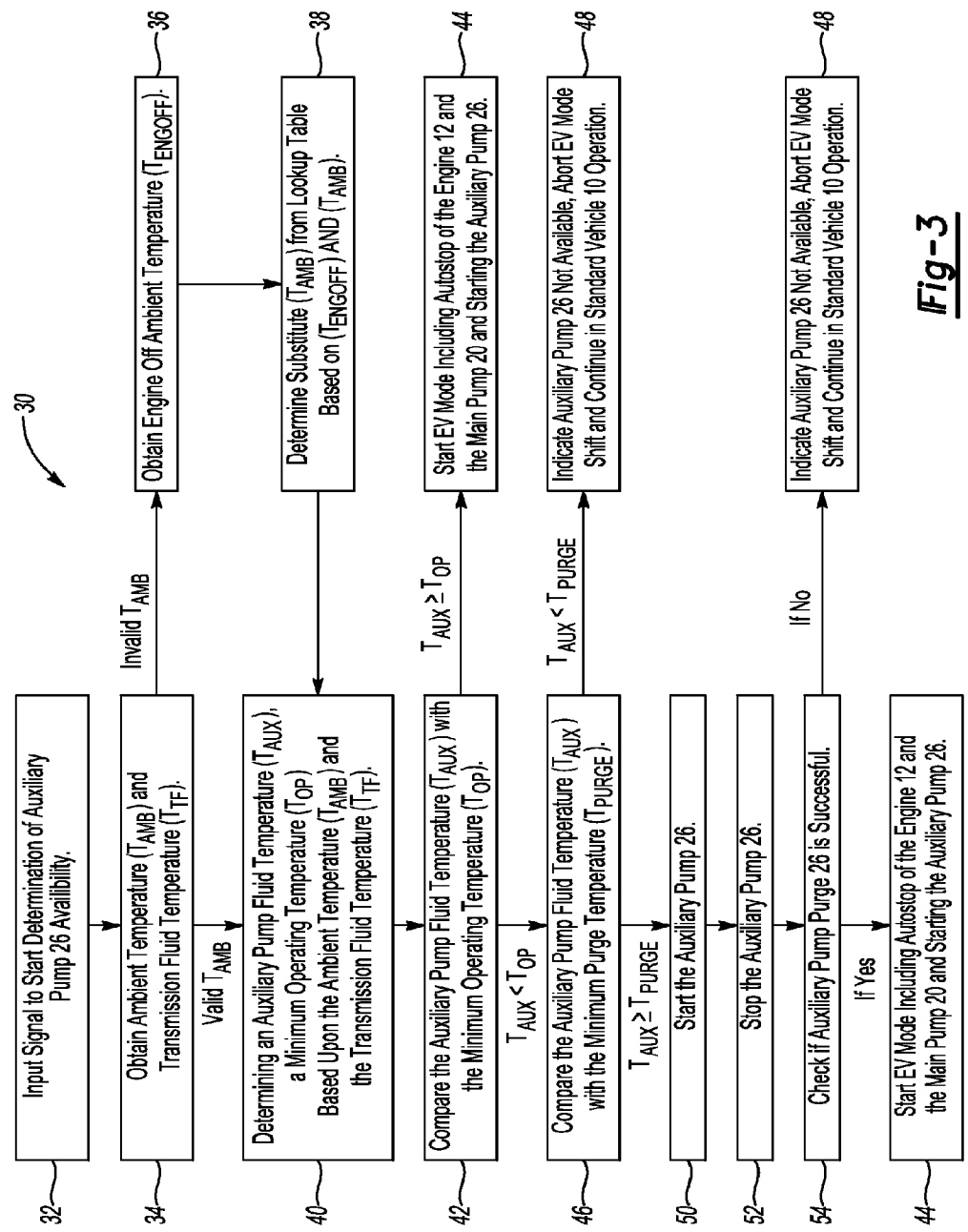
FIG. 3 is a schematic illustration of a method for purging the auxiliary pump for the vehicle of FIG. 1.

Referring to the flow chart of FIG. 3, determining EV mode availability for the vehicle 10 includes determining the auxiliary pump 26 readiness for EV mode operation, indicated at 30. The ECU 16 (shown in FIG. 1) first receives a signal, such as from vehicle sensors indicative of vehicle operating conditions appropriate for operation in the EV mode. The signal is input to start a determination of auxiliary pump 26 availability, step 32. The ECU 16 then obtains a measured ambient temperature ($T_{AMB}$) and the transmission fluid temperature ($T_{TF}$), step 34.

If an invalid ambient temperature ($T_{AMB}$) is obtained, the ECU 16 obtains an engine off time ($T_{ENGOFF}$), step 36. An invalid ambient temperature ($T_{AMB}$) may occur when a temperature sensor is unable to obtain a reading of the ambient temperature ($T_{AMB}$). The engine off time ($T_{ENGOFF}$) is the length of time the engine 12 has been turned off, i.e. the length of time the vehicle 10 was sitting and not operating. The ECU 16 then utilizes a lookup table to determine a substitute $T_{AMB}$, step 38. The lookup table utilizes the transmission 14 fluid temperature ($T_{TF}$). Based upon the transmission 14 fluid temperature ($T_{TF}$) and the engine off time ($T_{ENGOFF}$), a substitute ambient temperature ($T_{AMB}$) is obtained.

Once an ambient temperature ($T_{AMB}$) has been determined, by obtaining a valid ambient temperature in step 34, or by looking up a substitute ambient temperature ($T_{AMB}$) in step 38, then the ambient temperature ($T_{AMB}$) is compared with the transmission 14 fluid temperature ($T_{TF}$) to determine an auxiliary pump 26 fluid temperature ($T_{AUX}$), a minimum operating temperature ($T_{OP}$), and a minimum purge temperature ($T_{PURGE}$), step 40. Determining the auxiliary pump 26 fluid temperature ($T_{AUX}$), the minimum operating temperature ($T_{OP}$), and the minimum purge temperature ($T_{PURGE}$) can be accomplished by entering the ambient temperature ($T_{AMB}$) and the transmission 14 fluid temperature ($T_{TF}$) into predetermined formulas. Alternatively, a lookup table based on the ambient temperature ($T_{AMB}$) and the transmission 14 fluid temperature ($T_{TF}$) may be utilized.

The auxiliary pump 26 fluid temperature ($T_{AUX}$) is then compared with the minimum operating temperature ($T_{OP}$), step 42. If the auxiliary pump 26 fluid temperature ($T_{AUX}$) is greater than or equal to the minimum operating temperature ($T_{OP}$) then the vehicle 10 shifts to EV mode, step 44. Shifting to EV mode includes stopping the engine 12 and the main pump and starting the auxiliary pump 26.

If the auxiliary pump 26 fluid temperature ($T_{AUX}$) is less than the minimum operating temperature ($T_{OP}$), then ECU compares the auxiliary pump 26 fluid temperature ($T_{AUX}$) with the minimum purge temperature ($T_{PURGE}$), step 46. If the auxiliary pump 26 fluid temperature ($T_{AUX}$) is less then the minimum purge temperature ($T_{PURGE}$) then the ECU indicates the auxiliary pump 26 is not available, step 48. The shift to EV mode is aborted and the vehicle 10 continues operating in standard vehicle mode.

If the auxiliary pump 26 fluid temperature ($T_{AUX}$) is greater than the minimum purge temperature ($T_{PURGE}$), then the auxiliary pump 26 is started, step 50. Purging the auxiliary pump 26 includes cycling the fluid within the auxiliary pump 26 with fluid from a sump portion of the transmission 14. The fluid in the sump portion of the transmission 14 is at a higher temperature due to vehicle 10 operation. Utilizing fluid from the sump portion of the transmission 14 will not affect the line pressure of the fluid in the fluid lines of the currently operating main pump 20, because the main pump 26 is arranged in parallel with the auxiliary pump 26. The auxiliary pump 26 fluid temperature ($T_{AUX}$) is now above the minimum operating temperature ($T_{OP}$). The auxiliary pump 26 purge 38 only needs to occur for a short time period. For example, the auxiliary pump 26 may be purged for ten seconds. The purge time need only be sufficient to cycle the fluid from the sump of the transmission 14 into the auxiliary pump 26. One skilled in the art would know a proper amount of time for purging the auxiliary pump 26 based on the particular vehicle 10 and the auxiliary pump 26 arrangement.

After the auxiliary pump 26 is started and purged, step 50, then the auxiliary pump 26 is stopped, step 52. The ECU 16 is calibrated to start the auxiliary pump 26 from a stopped position, such as when no purge is required. Shifting the transmission 14 to EV mode with the auxiliary pump 26 already operating would place the ECU 16 out of synch with actual vehicle 10 conditions. Therefore, stopping the auxiliary pump 26 ensures the auxiliary pump 26 begins operation with all components at a stop. Once the shift to EV mode is started the operation of the auxiliary pump 26 by the ECU 16 is the same, whether the auxiliary pump 26 purged or did not purge. The auxiliary pump 26 need only be stopped, step 52, for sufficient time to bring the auxiliary pump 26 back to a start position. For example, the auxiliary pump stop 52 may be one second. One skilled in the art would know a proper amount of time for purging the auxiliary pump, steps 50 and 52 based on the vehicle 10 and the auxiliary pump 26 arrangement.

Once the auxiliary pump 26 is stopped, the ECU 16 checks to see if a successful auxiliary pump 26 purge was successful, step 54. For example, the auxiliary pump 26 purge may not be successful if a stall of the auxiliary pump 26 is detected. If the auxiliary pump 26 purge was successful the vehicle 10 is shifted to EV mode, step 44. As is the case when no previous purge has occurred, shifting to EV mode includes stopping the engine 12 and the main pump 20 and starting the auxiliary pump 26. If the auxiliary pump 26 purge was not successful the ECU 16 instructs that the auxiliary pump 26 is not available, step 48, and the EV mode shift is aborted. The vehicle 10 continues to operate in standard vehicle operation mode until a new EV mode request is sent. At that time the ECU 16 checks the transmission 14 fluid temperature ($T_{TF}$) and instructs a shift only when the transmission 14 fluid temperature ($T_{TF}$) is within a standard operating temperature range.

While the best modes for carrying out the invention have been described in detail, those familiar with the art to which this invention relates will recognize various alternative designs and embodiments for practicing the invention within the scope of the appended claims.

The invention claimed is:

1. A method for operating an auxiliary pump for an electrically variable transmission for a vehicle comprising:
   obtaining an ambient temperature and a transmission fluid temperature;
   comparing the ambient temperature with the transmission fluid temperature to determine an auxiliary pump fluid temperature, a minimum operating temperature, and a minimum purge temperature;
   comparing the auxiliary pump fluid temperature with the minimum purge temperature;
   purging the auxiliary pump when the auxiliary pump fluid temperature is below the minimum operating temperature and above the minimum purge temperature; and
   instructing a shift to electric vehicle mode of the transmission when one of the auxiliary pump fluid temperature is not less than the minimum operating temperature and the purging of the auxiliary pump is completed.

2. The method of claim 1, wherein obtaining the ambient temperature further includes one of obtaining a sensor reading and utilizing a lookup table.

3. The method of claim 2, wherein utilizing a lookup table to determine the ambient temperature further includes obtaining an engine off time period.

4. The method of claim 1, wherein purging the auxiliary pump further includes starting the auxiliary pump and stopping the auxiliary pump.

5. The method of claim 1, wherein the transmission is operated with a main transmission pump during the purging.

6. The method of claim 1, further including determining if the purging of the auxiliary pump was completed and instructing an abort in shifting to electric vehicle mode if the purging of the auxiliary pump is not completed.

7. A method for operating an electrically variable transmission for a vehicle comprising:
   obtaining an ambient temperature and a transmission fluid temperature;
   comparing the ambient temperature with the transmission fluid temperature to determine an auxiliary pump fluid temperature, a minimum operating temperature, and a minimum purge temperature;
   comparing the auxiliary fluid temperature with the minimum purge temperature;
   starting the auxiliary pump when the auxiliary pump fluid temperature is below the minimum operating temperature and above the minimum purge temperature;

stopping the auxiliary pump; and instructing a shift to electric vehicle mode.

8. The method of claim 7, wherein obtaining the ambient temperature further includes one of obtaining a sensor reading and utilizing a lookup table.

9. The method of claim 8, wherein the transmission is operated with a main transmission pump during the purging.

10. The method of claim 7, wherein the starting of the auxiliary pump further includes continuing to operate the transmission with a main transmission pump.

11. The method of claim 7, further including instructing an abort in shifting to electric vehicle mode if the starting of the auxiliary pump is not completed.

12. The method of claim 7, wherein instructing the shift to electric vehicle mode of the transmission if the starting of the auxiliary pump is completed.

13. The method of claim 7, wherein instructing the shift to electric vehicle mode of the transmission if the ambient temperature is greater than or equal to the predetermined minimum ambient temperature.

* * * * *